United States Patent [19]
van Velzen et al.

[11] Patent Number: 5,433,828
[45] Date of Patent: Jul. 18, 1995

[54] METHOD FOR THE REMOVAL OF HYDROGEN SULFIDE AND/OR CARBON DISULFIDE FROM WASTE GASES

[75] Inventors: Daniel van Velzen, Brebbia; Heinrich Langenkamp, Cadrezzate, both of Italy

[73] Assignee: European Atomic Energy Community (Euratom), Luxembourg

[21] Appl. No.: 137,131

[22] PCT Filed: Apr. 22, 1992

[86] PCT No.: PCT/EP92/00885
§ 371 Date: Mar. 28, 1994
§ 102(e) Date: Mar. 28, 1994

[87] PCT Pub. No.: WO92/19363
PCT Pub. Date: Nov. 12, 1992

[30] Foreign Application Priority Data
Apr. 24, 1991 [LU] Luxembourg .............. 87 923

[51] Int. Cl.⁶ .................. C25B 1/02; C25B 1/24
[52] U.S. Cl. ...................... 204/128; 204/129; 473/220; 473/243.01; 473/522; 473/486; 473/437 R; 55/220; 55/222; 55/244; 55/257.1; 55/268

[58] Field of Search .............. 204/128, 129, 59 R; 55/222, 244, 257.1, 268, 220; 423/220, 243.01, 522, 520, 486, 437 R

[56] References Cited

U.S. PATENT DOCUMENTS

| | | | |
|---|---|---|---|
| 2,809,930 | 10/1957 | Miller | 204/136 |
| 3,401,101 | 9/1968 | Keller, Jr. | 204/136 |
| 4,668,490 | 5/1987 | van Velzen et al. | 423/242 |

FOREIGN PATENT DOCUMENTS

| | | |
|---|---|---|
| 0016290 | 10/1980 | European Pat. Off. . |
| 0171570 | 2/1986 | European Pat. Off. . |
| 8103346 | 11/1981 | WIPO . |

*Primary Examiner*—Kathryn Gorgos
*Attorney, Agent, or Firm*—Sughrue, Mion, Zinn, Macpeak & Seas

[57] ABSTRACT

The invention relates to a process for removing hydrogen sulfide ($H_2S$) and/or carbon disulfide ($CS_2$) from exhaust gases. These exhaust gases are brought into contact with water and bromine so that $H_2SO_4$ and HBr in aqueous solution and possible $CO_2$ are formed. Bromine is regenerated from the hydrobromic acid in an electrolysis cell. In addition, marketable hydrogen is produced.

5 Claims, 1 Drawing Sheet

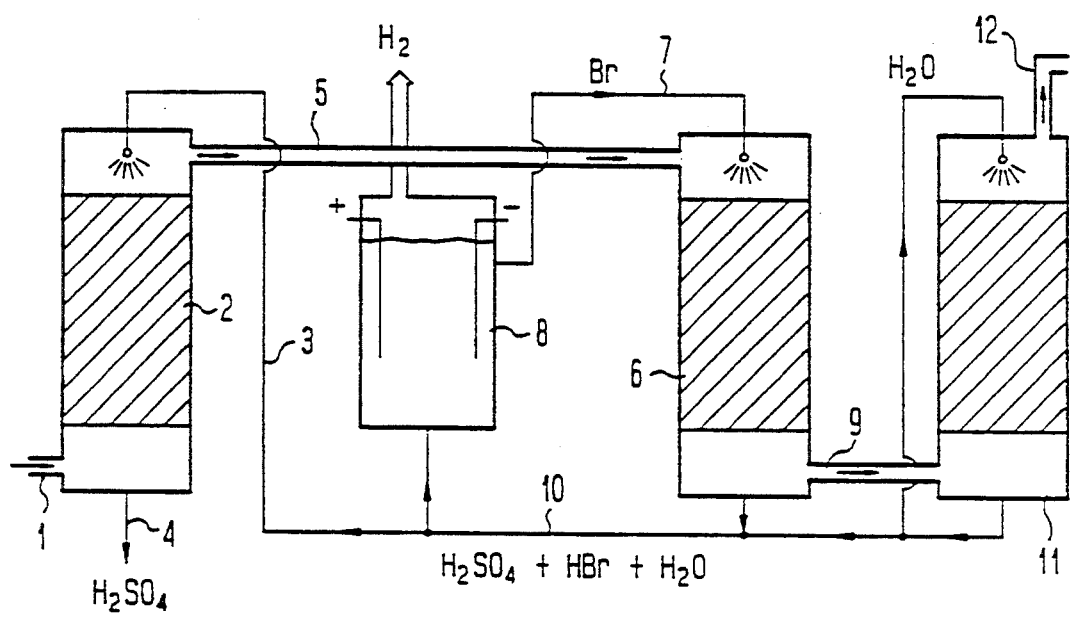

METHOD FOR THE REMOVAL OF HYDROGEN SULFIDE AND/OR CARBON DISULFIDE FROM WASTE GASES

BACKGROUND OF THE INVENTION

The invention relates to a method for the removal of hydrogen sulfide and/or carbon disulfide from waste gases. Both compounds occur, alone or in combination, as waste gases of chemo-technical processes, for example, during the manufacture of rayon. They are very noxious agents. Carbon disulfide ($CS_2$) can cause acute and chronic forms of poisoning, with psychological and behavioral changes, if the patient has been exposed to a concentration between 30 and 120 $mg/m^3$. For this reason, maximum concentrations of carbon disulfide of only 30 $mg/m^3$ are allowed for working environment.

Hydrogen sulfide ($H_2S$) is similarly poisonous. With concentrations of about 5000 ppm, there is a risk of immediate coma. The presently valid maximum values for hydrogen sulfide are approximately 15 $mg/m^3$.

SUMMARY OF THE INVENTION

Known methods for the removal of $H_2S$ and $CS_2$ rely mainly on the absorption of activated carbon. For the removal of hydrogen sulfide alone, there exist scrubbing processes normally using a caustic soda solution as a scrubbing agent. All these methods are expensive and produce considerable waste waters themselves.

It is, thus, the aim of the invention to present a method of the type mentioned above in which no expensive scrubbing agents are used and no polluting waste waters are produced.

This problem is solved according to the invention by the fact that the waste gases are brought into contact with water and bromine, so that sulfuric acid and hydrobromic acid in an aqueous solution with a bromine proportion of less than 0.5% by weight and possibly carbon dioxide are formed, and that in an electrolytic cell bromine and water are reproduced from said hydrobromic acid.

It is advantageous to subsequently concentrate the sulfuric acid and to lead the waste gases to be cleaned firstly through the sulfuric acid concentrator, which is then fed with the aqueous solution thus formed, so that the latter leaves the concentrator in a vapor state together with the waste gases. If the waste gases are present at a high temperature level, their heat contents can be used, either alone or in combination with an external heat source, for the operation of the sulfuric acid concentrator.

BRIEF DISCUSSION OF THE DRAWINGS

The FIGURE schematically illustrates a hydrogen sulfide and/or carbon disulfide removal process in accordance with the present invention.

DESCRIPTION OF THE PREFERRED EMBODIMENT

It is known per se that bromine is capable of producing elementary sulfur from sulfur compounds. Examples of such processes are described in U.S. Pat. Nos. 2,809,930 and 3,401,101. Thus, U.S. Pat. No. 2,809,930 concerns the elimination of $H_2S$ from gasoline. Firstly, $H_2S$ is separated in a contactor by means of caustic soda, then the caustic soda solution is treated with bromine in a reactor, whereby sulfur is obtained. Surprisingly, the method according to the invention produces sulfuric acid, which can be concentrated and sold.

Further, it is known from Gmelin's Handbuch der anorganischen Chemie, 8th edition 1931, bromine system number 7, page 185, that $H_2S$ and bromine are converted into $S_2Br_2$ and sulfur-free HBr-gas. Of course, the used reagents are pure respectively highly concentrated reagents.

Finally, EP-A-0 171 570 should be discussed, from which the elimination of sulfur dioxide $SO_2$ from waste gases by means of bromine is known which creates sulfuric acid.

The invention will now be described by means of a preferred embodiment with reference to the sole figure which shows diagrammatically an installation for performing the method according to the invention.

If hydrogen sulfide and carbon disulfide are brought into contact with bromine and water, sulfuric acid and hydrobromic acid are obtained, for example according to the following formulas:

$$H_2S + 4Br_2 + 4H_2O \rightarrow H_2SO_4 + 8HBr$$

$$CS_2 + 8Br_2 + 10H_2O \rightarrow 2H_2SO_4 + CO_2 + 16 HBr$$

The reaction velocity depends on the diffusion rate of the gaseous components into the gas/liquid boundary layer and can be enhanced by adequate constructive measures at the exchanger columns.

It has been shown that even with very small concentrations of the pollutants (less than 1000 ppm) a sufficient reaction rate and an almost complete conversion of the pollutants are obtained. Suitable limits for the concentrations of the various compounds in the remaining solution are:

| | |
|---|---|
| for sulfuric acid | 50% by weight |
| for hydrobromic acid | a minimum value of 5% and a maximum value of 40% |
| for bromine | a maximum value of 10% by weight |

The bromine which is needed for the conversion of $H_2S$ and/or $CS_2$ in the waste gases can be recovered by electrolysis from the reaction product hydrobromic acid HBr according to the formula $$2HBr \rightarrow H_2 + Br_2$$

This reaction produces hydrogen, which can be considered a valuable and saleable by-product.

The electrolysis is carried out in a cell, in which only low voltages (between 1.0 and 1.6 V) are required to obtain the decomposition of HBr. Hydrogen is obtained in the gaseous phase and can easily be purified from traces of bromine and water vapor. The produced bromine remains dissolved in the circulating liquid.

With reference to the drawings, a concrete embodiment of the invention will now be described. The waste gases are fed via an inlet duct 1 to a sulfuric acid concentrator 2 which is, for example, a spray column or a droplet contactor, including liquid feedback. This concentrator is also fed via a duct 3 with an aqueous solution of 20 wt % of sulfuric acid and 15 wt % of hydrobromic acid HBr. The waste gases contain, for example, 3.0 $g/Nm^3$ of sulfur dioxide ($SO_2$) and 0.3 $g/Nm^3$ of hydrogen sulfide ($H_2S$) and have a temperature of 185° C. Due to the effective heat exchange between the hot waste gases and the aqueous solution, the total quantity of HBr and a great part of the water vaporize, so that at the outlet 5 of the concentrator for the gaseous components, the waste gases and these vaporized components are present in common; whereas in the concentrator 2 itself, the sulfuric acid due to its higher boiling point is concentrated and evacuated after regular periods via an outlet duct 4 as a saleable product with a concentration between 65 and 75 wt %. In an installation, in which waste gases of the above cited composition are to be treated in an amount of 50 m$^3$/h, sulfuric acid is produced in a quantity of 140 g/h.

The waste gases are cooled down in the concentrator to 130° C. and thus reach the main reactor 6, which can, for example, be a downflow column with a contact package. In this reactor, the mixture of vapours and waste gases comes into contact with a solution which is fed via a duct 7 from an electrolytic cell 8 and which contains 0.5 wt. % of bromine. The hydrobromic acid which is fed in vapour state together with the waste gases is absorbed in the liquid of the reactor 6, whereas the cited pollutants react with bromine and water in the reactor 6 according to the above cited formulas and produce hydrobromic acid (HBr), sulfuric acid ($H_2SO_4$) and possibly carbon dioxide ($CO_2$). The first two products remain at constant quantity in the liquid phase, whereas the last-mentioned product reaches a washing column 11 together with the remaining waste gases via a connection duct 9, in which column the last remainders of HBr vapor, which are in equilibrium with the liquid phase, are evacuated by contact with water. The washing water is continuously recycled via the wash column. A small portion of this washing water is re-fed into the reactor 6 in order to retain all HBr in the installation. The cleaned waste gases leave the installation via a duct 12 towards a chimney (not shown).

These waste gases contain practically no more hydrogen sulfide.

It is advantageous to use less bromine in the reactor 6 than would be necessary for the stoichiometrically balance of the considered reactions with the pollutants. In this way, the cleaning effect of the reactor is slightly reduced, but a possible loss of bromine is avoided.

The temperature of the reactor 6 must be monitored in such a way that the gas in the outlet duct 9 has a sufficient humidity in order to withdraw the water from the incoming waste gases. Normally, no special temperature control is necessary, and the reactor can be operated adiabatically. The required reaction temperature lies between 55° and 65° C. The major part of the liquid phase leaves the reactor 6 via a duct 10 which leads to the electrolytic cell 8. The throughput in this duct is at least 32 kg/h, when an aqueous solution with 0.5 wt % $Br_2$ is to be produced. Practically, a much higher throughput is often chosen, for example, 250 l/h, which decreases the bromine part in the duct 7 to 0.05 wt %. A partial flow of this aqueous solution of sulfuric acid and hydrobromic acid of about 500 g/h conveyed in the duct 10 is fed via the duct 3 into the sulfuric acid concentrator 2; by this means sulfuric acid is evacuated from the circuit which consists of the reactor 6 and the electrolytic cell 8.

The electrolytic cell 8 can be a cell without a diaphragm, which has electrodes of graphite or metal electrodes. The electrode surface can be about 500 cm$^2$. The total cell current is about 75 A and the current density about 1.5 kA/m$^2$. The cell voltage lies between 1.4 and 1.5 V. The energetic efficiency of such a cell is, in general, about 85%. With reference to the above cited dimensions of the installation, a hydrogen production of 30 l/h can be expected, while 200 g/h bromine pass through the duct 7.

It is to be noted that no solid particles or muds are used for the reactions. The reaction rates are high and can continuously be supervised, so that reactors of small dimensions can be used.

The invention is not restricted in all the details to the described embodiment. Thus, if the heat delivered by the waste waters is not sufficient for the concentration of sulfuric acid, an external heat source can, of course, be added, which can also cause water and HBr to vaporize prior to being fed into the reactor 6. The concentrator can be omitted when a higher concentration of sulfuric acid is not desired. The original waste gases can contain, instead of $H_2S$ or additionally thereto, carbon disulfide ($CS_2$), which is evacuated according to the above cited reaction formula.

A side effect of the process according to the invention is that also the proportion of sulfur dioxide in the waste gas is drastically reduced by this method. Thus, tests have shown that an amount of 3.0 Nm$^3$ of sulfur dioxide in the original waste gases can be reduced to one tenth of this value in the product gas to be fed into the chimney.

We claim:

1. A method for removing a compound selected from the group consisting of hydrogen sulfide, carbon disulfide and mixtures thereof from waste gases, comprising the step of contacting the waste gases with water and bromine to form an aqueous solution of sulfuric acid and hydrobromic acid, and producing bromine and hydrogen from the hydrobromic acid in an electrolytic cell.

2. A method according to claim 1, further comprising the step of concentrating the waste gases in a sulfuric acid concentrator prior to contacting the waste gases with water and bromine, feeding the aqueous solution of hydrobromic acid and sulfuric acid into the concentrator, and releasing from the separator hydrobromic acid vapor together with the waste gases.

3. A method according to claim 2, wherein the hydrobromic acid and water are vaporized in the sulfuric acid concentrator to form the hydrobromic acid vapor using heat at least partially derived from the waste gases.

4. A method according to one of claims 1 to 3, further comprising the step of cleaning with water product gases created during the step of contacting the waste gases with water and bromine.

5. A method according to claim 1, wherein carbon dioxide is formed in the aqueous solution of sulfuric acid and hydrobromic acid.

* * * * *